(12) United States Patent
Opitz et al.

(10) Patent No.: US 6,841,937 B2
(45) Date of Patent: Jan. 11, 2005

(54) COLORED ELECTRIC LAMP WITH A COLORED PIGMENT-CONTAINING COATING

(75) Inventors: Joachim Opitz, Aachen (DE); Sonja Louisa Leona Ceulemans, Weert (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 94 days.

(21) Appl. No.: 09/864,134

(22) Filed: May 24, 2001

(65) Prior Publication Data

US 2002/0011776 A1 Jan. 31, 2002

(30) Foreign Application Priority Data

May 31, 2000 (DE) .......................................... 100 26 908

(51) Int. Cl.$^7$ ............................ H01K 1/32; H01J 61/40
(52) U.S. Cl. ........................ 313/635; 313/487; 313/112
(58) Field of Search ................................ 313/112, 635, 313/485–487, 580, 489; 252/301.4 R, 301.4 F, 301.6 R, 301.6 F; 220/2.1 R

(56) References Cited

U.S. PATENT DOCUMENTS 4,339,686 A * 7/1982 Potter .......................... 313/635

(List continued on next page.)

FOREIGN PATENT DOCUMENTS

EP           0697373 A1     2/1996      ......... C01B/21/082

*Primary Examiner*—Ashok Patel

(57) ABSTRACT

An electric lamp which is provided with an electric light source in a light-transmitting bulb provided with a coating comprising an inorganic colored pigment selected from the group formed by oxide nitride pigments of the general formula $A_{1-x}A'_xBO_{2-x}N_{1+x}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<x<1 or an oxide-nitride pigment of the general formula $AB_{1-x}B'_xBO_{1+x}N_{2-x}$, wherein A=Mg, Ca, Sr, Ba, Zn, A'=Ln, Bi, Al, Fe, B=V, Nb, Ta, Mo W and B'=Ti, Zr, Hf, Sn, Ge, Si, Nb, Ta and 0<x<1 or an oxide-nitride pigment of the general formula $A_yA'_{2-y}B_2O_{5+y}N_{2-y}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<y<2 or an oxide-nitride pigment of the general formula $A'_2B_{2-y}B'_yO_{5+y}N_{2-y}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<y<2 or an oxide-nitride pigment of the general formula $CD_{2-m}D'_mO_{4-m}N_m$, wherein C=Mg, Ca, Mn, Fe, Co, Ni, Zn and D=Al, Ga, In, Ti, V, Cr, Fe, Co, Ni and D'=Ti, Zr, HF, Sn, Ge, Si, Nb, Ta, and 0<m<2 or an oxide-nitride pigment of the general formula $C_{1-n}C'_nD_2O_{4-n}N_n$, wherein C=Mg, Ca, Mn, Fe, Co, Ni, Zn, C'=Al, Ga, In, Ti, V, Cr, Fe, Co, Ni, D=Al, Ga, In, Ti, V, Cr, Fe, Co, Ni and 0<n<2 or an oxide-nitride pigment of the general formula $A'_2CBO_5N$, wherein A'=Ln, Bi, Al, Fe, C=Mg, Ca, Mn, Fe, Co, Ni, Zn, B=V, Nb, Ta, Mo, W or an oxide-nitride pigment of the general formula $A'_2A''BO_4N_2$, wherein A'=Ln, Bi, Al, Fe, A''=Ln, Bi, B=V, Nb, Ta, Mo, W or an oxide-nitride pigment of the general formula $A'_2DBO_3N_3$, wherein A'=Ln, Bi, Al, Fe, D=Al, Ga, In, Ti, V, Cr, Fe, Co, Ni and B=V, Nb, Ta, Mo, W and with means for operating the electric light source.

8 Claims, 1 Drawing Sheet

U.S. PATENT DOCUMENTS

| | | | | |
|---|---|---|---|---|
| 4,421,803 A | * | 12/1983 | Czeiler et al. | 220/2.1 R |
| 4,499,397 A | * | 2/1985 | James | 313/112 |
| 5,742,126 A | * | 4/1998 | Fujii et al. | 313/635 |
| 5,744,900 A | | 4/1998 | Labant | 313/112 |
| 5,962,972 A | * | 10/1999 | Engels et al. | 313/578 |
| 5,965,983 A | * | 10/1999 | Bouwkamp-Wijnoltz et al. | 313/635 |

* cited by examiner

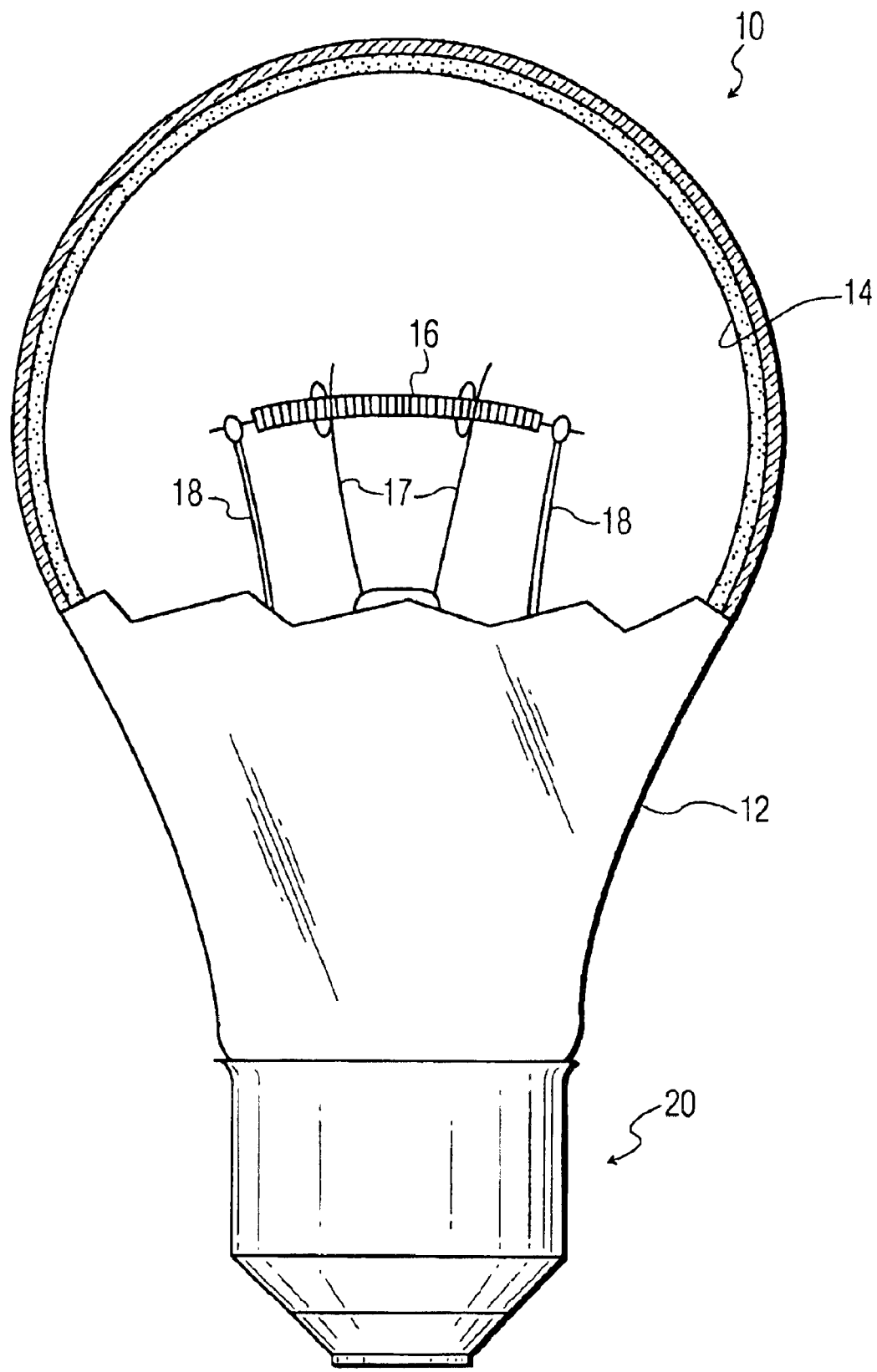

COLORED ELECTRIC LAMP WITH A COLORED PIGMENT-CONTAINING COATING

The invention relates to a colored electric lamp which is provided with an electric light source in a light-transmitting bulb having a coating containing an inorganic colored pigment, and with means for operating the electric light source.

Electric lamps emitting light in the colors red, green, blue and yellow or in pastel colors are popular for use as decorative lighting for both exteriors and interiors. A drawback of conventional lamps of this type resides in that the color pigments used often comprise toxic substances which are harmful to the environment, such as cadmium, selenium or chromates.

U.S. Pat. No. 5,744,900 discloses how to avoid the use of cadmium and selenium-containing pigments for colored lamps. Said document proposes the use of an electric lamp emitting pink light in the operating state, which is provided with a light-transmitting bulb which comprises an electric light source and to which a pink coating is applied. This coating includes a pink inorganic chromium-tin pigment and red iron oxide. The drawback of these lamps resides in that iron oxide pigments tend to become darker.

Such a lamp is illustrated in said U.S. Pat. No. 5,744,900 and in the FIGURE herein which illustrates an incandescent lamp 10 having a light transmissive glass envelope 12 enclosing a filament 16. The filament 16 is electrically connected to and supported by lead-ins 18 which extend through the seal of the lamp (not shown) and are attached to the metal screw base 20. If desired, additional support for the filament may be provided by support wires 17. The interior of envelope 12 is coated with a coating 14.

It is an object of the invention to provide a colored electric lamp which does not comprise toxic, environmentally harmful substances and which has a long service life when used for indoor and outdoor lighting.

In accordance with the invention, this object is achieved by an electric lamp which is provided with an electric light source in a light-transmitting bulb provided with a coating 14 comprising an inorganic colored pigment selected from the group formed by oxide nitride pigments of the general formula $A_{1-x}A'_xBO_{2-x}N_{1+x}$, wherein A=Mg, Ca, Sr, Ba, Zn, A'=Ln, Bi, Al, Fe, B=V, Nb, Ta, Mo, and B'=Ti, Zr, Hf, Sn, Ge, Si, Nb, Ta and 0<x<1 or an oxide-nitride pigment of the general formula $AB_{1-x}B'_xBO_{1+x}N_{2-x}$, wherein A=Mg, Ca, Sr, Ba, Zn, A'=Ln, Bi, Al, Fe, B=V, Nb, Ta, Mo W and B'=Ti, Zr, Hf, Sn, Ge, Si, Nb, Ta and 0<x<1 or an oxide-nitride pigment of the general formula $A_yA'_{2-y}B_2O_{5+y}N_{2-y}$, wherein A=Mg, Ca, Sr. Ba, Zn, A'=Ln, Bi, Al, Fe, B=V, Nb, Ta, Mo, W and B'=Ti, Zr, Hf, Sn, Ge, Si, Nb, Ta and 0<y<2 or an oxide-nitride pigment of the general formula $A'_2B_{2-y}B'_yO_{5+y}N_{2-y}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<y<2 or an oxide-nitride pigment of the general formula $CD_{2-m}D'_mO_{4-m}N_m$, wherein C=Mg, Ca, Mn, Fe, Co, Ni, Zn and D=Al, Ga, In, Ti, V, Cr, Fe, Co, Ni and D'=Ti, Zr, HF, Sn, Ge, Si, Nb, Ta, and 0<m<2 or an oxide-nitride pigment of the general formula $C_{1-n}C''_nD_2O_{4-n}N_n$, wherein C=Mg, Ca, Mn, Fe, Co, Ni, Zn, C'=Al, Ga, In, Ti, V, Cr, Fe, Co, Ni, D=Al, Ga, In, Ti, V, Cr, Fe, Co, Ni and 0<n<2 or an oxide-nitride pigment of the general formula $A'_2CBO_5N$, wherein A'=Ln, Bi, Al, Fe, C=Mg, Ca, Mn, Fe, Co, Ni, Zn, B=V, Nb, Ta, Mo, W or an oxide-nitride pigment of the general formula $A'_2A''BO_4N_2$, wherein A'=Ln, Bi, Al, Fe, A''=Ln, Bi, B=V, Nb, Ta, Mo, W or an oxide-nitride pigment of the general formula $A'_2DBO_3N_3$, wherein A'=Ln, Bi, Al, Fe, D=Al, Ga, In, Ti, V, Cr, Fe, Co, Ni and B=V, Nb, Ta, Mo, W and with means for operating the electric light source.

A lamp of this type exhibits a color in the red, orange or yellow spectrum, which does not become darker in the case of a temperature increase or in contact with reactive gases.

Said lamp does not comprise toxicologically precarious colored pigments and hence is suitable for reprocessing or sanitation in garbage incinerating plants.

Within the scope of the invention, the electric lamp preferably is an incandescent lamp. As the pigments used are chemically inert, such an incandescent lamp can be evacuated instead of having to be filled with an inert gas. This is advantageous because evacuated electric incandescent lamps can be handled more safely. The vacuum in the bulb precludes breakage of the lamp in the case of a temperature shock when, for example, outdoors the hot lamp comes into contact with water or rain.

As the oxide nitride colored pigments are not only chemically inert but also thermally stable, the coating comprising the oxide nitride colored pigments can be applied to the inner surface of the bulb.

To soften the color, the coating may additionally comprise a white pigment.

Hereinafter, the invention will be explained in greater detail by means of two examples. In principle, the electric lamp can be embodied so as to be an incandescent lamp or a gas discharge lamp. In accordance with a preferred embodiment according to the invention, the electric lamp is an incandescent lamp wherein the light source is an incandescent wire of a metal having a high melting point. The incandescent wire is embodied so as to be a single-coil filament or a double-coil filament and is held in a glass or quartz bulb between two current supply electrodes.

The bulb is provided with a coating comprising an oxide nitride colored pigment selected from the group formed by oxide nitrides of the general formula $A_{1-x}A'_xBO_{2-x}N_{1+x}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<x<1 or an oxide-nitride pigment of the general formula $AB_{1-x}B'_xBO_{1+x}N_{2-x}$, wherein A=Mg, Ca, Sr, Ba, Zn, A'=Ln, Bi, Al, Fe, B=V, Nb, Ta, Mo W and B'=Ti, Zr, Hf, Sn, Ge, Si, Nb, Ta and 0<x<1 or an oxide-nitride pigment of the general formula $A_yA'_{2-y}B_2O_{5+y}N_{2-y}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<y<2 or an oxide-nitride pigment of the general formula $A'_2B_{2-y}B'_yO_{5+y}N_{2-y}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<y<2 or an oxide-nitride pigment of the general formula $CD_{2-m}D'_mO_{4-m}N_m$, wherein C=Mg, Ca, Mn, Fe, Co, Ni, Zn and D=Al, Ga, In, Ti, V, Cr, Fe, Co, Ni and D'=Ti, Zr, HF, Sn, Ge, Si, Nb, Ta, and 0<m<2 or an oxide-nitride pigment of the general formula $C_{1-n}C'_nD_2O_{4-n}N_n$, wherein C=Mg, Ca, Mn, Fe, Co, Ni, Zn, C'=Al, Ga, In, Ti, V, Cr, Fe, Co Ni, D=Al, Ga, In, Ti, V, Cr, Fe, Co, Ni and 0<n<2 or an oxide-nitride pigment of the general formula $A'_2CBO_5N$, wherein A'=Ln, Bi, Al, Fe, C=Mg, Ca, Mn, Fe, Co, Ni, Zn, B=V, Nb, Ta, Mo, W or an oxide-nitride pigment of the general formula $A'_2A''BO_4N_2$, wherein A'=Ln, Bi, Al, Fe, A''=Ln, Bi, B=V, Nb, Ta, Mo, W or an oxide-nitride pigment of the general formula $A'_2DBO_3N_3$, wherein A'=Ln, Bi, Al, Fe, D=Al, Ga, In, Ti, V, Cr, Fe, Co, Ni and B=V, Nb, Ta, Mo, W.

These pigments and methods for the manufacture thereof are disclosed in EP 0 697 373.

The properties of the oxide-nitride colored pigments are subject to the mixing rule, i.e. the properties change continuously with the composition, the color of the pigments varies as a function of the composition from red via orange to yellow. Dependent upon the particle size of the pigments, the coatings obtained are transparent or opaque.

Preferably, the inside of the bulb is provided with a coating.

To manufacture the coating use is made of said pigment or a pigment mixture. The pigment mixture may comprise one or more oxide nitride colored pigments to which a white pigment may additionally be added. Suitable white pigments are, for example, kaolin, feldspar, silicon dioxide or titanium dioxide.

A pigment mixture is prepared by dry-mixing the pigment powder. A typical mixture comprises 20% by weight titanium dioxide, 50% by weight pyrogenic silicic acid and 30% by weight precipitated silicic acid, which are mixed with an oxide nitride pigment in a ratio of 4 to 1.

These layers can be prepared by means of dry-coating methods, such as electrostatic deposition or electrostatically-assisted powdering, as well as wet-coating methods, such as dip-coating or spraying.

In the case of wet-coating methods, the pigments must be dispersed in water, an organic solvent, if necessary in conjunction with a dispersing agent, a surface-active agent and an anti-foaming agent, or a binder preparation. Organic or inorganic binders which are capable of resisting an operating temperature of 250° C. without being subject to decomposition, embrittlement or discoloration can suitably be used as the binder preparations for a lamp in accordance with the invention.

Preferably, the pigment mixture is electrostatically deposited on the inside of the lamp bulb. The layer thickness of the oxide nitride pigment-containing coating lies in the range from 50 to 100 μm.

The coated lamp envelope is provided with a filament, evacuated and sealed-off. The electric contacts of the filament which issue to the exterior are connected to the metal cap of the lamp.

Dependent upon the oxide nitride pigment chosen and the composition of the pigment mixture, a lamp is obtained of a color in the red to yellow color spectrum, and, in combination with white pigments, also the associated pastel colors.

EXAMPLE 1

A mixture of 50 g pyrogenic silicic acid, 270 g precipitated silicic acid, 30 g titanium dioxide (Rutil) and 50 g red oxide nitride-colored pigment are subjected to a dry-grinding operation in a vibratory mill and mixed. A free-flowing powder mixture is obtained which does not contain visible inhomogeneities. The mixture is electrostatically deposited on the inside of the lamp bulb. The coating has a thickness of 75 μm. The glass bulb is provided with a wire coil of tungsten, baked out at 500° C., evacuated and sealed-off. A metal cap is mounted. In operation, the lamp emits decorative red light. The service life exceeds 1000 hours.

EXAMPLE 2

A mixture of 250 g feldspar, 70 g pyrogenic silicic acid, 25 g titanium dioxide (Rutil), 30 g yellow and 25 g red oxide nitride colored pigment are subjected to a dry grinding process in a vibratory mill and mixed. A free-flowing powder mixture is obtained which does not contain visible inhomogeneities. The mixture is electrostatically deposited on the inside of a lamp bulb. The coating has a thickness of 85 μm. The glass bulb is provided with a wire coil of tungsten, baked out at 500° C., evacuated and sealed-off. A metal cap is mounted. In the operating state, the lamp emits decorative orange-colored light. The service life exceeds 1000 hours.

What is claimed is:

1. An electric lamp which is provided with an electric light source in a light-transmitting bulb provided with a coating consisting essentially of an inorganic colored pigment selected from the group formed by oxide nitride pigments of the general formula $A_{1-x}A'_xBO_{2-x}N_{1+x}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<x<1 or an oxide-nitride pigment of the general formula $AB_{1-x}B'_xBO_{1+x}N_{2-x}$, wherein A=Mg, Ca, Sr, Ba, Zn, A'=Ln, Bi, Al, Fe, B=V, Nb, Ta, Mo, W and B'=Ti, Zr, Hf, Sn, Ge, Si, Nb, Ta and 0<x<1 or an oxide-nitride pigment of the general formula $A_y A'_{2-y} B_2 O_{5+y} N_{2-y}$, wherein A = Mg, Ca, Sr, Ba, Zn, A'= Ln, Bi, Al, Fe, B = V, Nb, Ta, Mo, W and B'= Ti, Zr, Hf, Sn, Ge, Si, Nb, Ta and $0 < y < 2$ or an oxide-nitride pigment of the general formula $A'_2 B_{2-y} B'_y O_{5+y} N_{2-y}$, wherein A = Mg, Ca, Sr, Ba, Zn, A'= Ln, Bi, Al, Fe, B = V, Nb, Ta, Mo, W and B'= Ti, Zr, Hf, Sn, Ge, Si, Nb, Ta and $0 < y < 2$ or an oxide-nitride pigment of the general formula $CD_{2-m} D'_m O_{4-m} N_m$, wherein C = Mg, Ca, Mn, Fe, Co, Ni, Zn and D = Al, Ga, In, Ti, V, Cr, Fe, Co, Ni and D'= Ti, Zr, Hf, Sn, Ge, Si, Nb, Ta, and $0 < m < 2$ or an oxide-nitride pigment of the general formula $C_{1-n} C'_n D_2 O_{4-n} N_n$, wherein C = Mg, Ca, Mn, Fe, Co, Ni, Zn, C'= Al, Ga, In, Ti, V, Cr, Fe, Co, Ni, D = Al, Ga, In, Ti, V, Cr, Fe, Co, Ni and $0 < n < 2$ or an oxide-nitride pigment of the general formula $A'_2 CBO_5 N$, wherein A'= Ln, Bi, Al, Fe, C = Mg, Ca, Mn, Fe, Co, Ni, Zn, B = V, Nb, Ta, Mo, W or an oxide-nitride pigment of the general formula $A'_2 A'' BO_4 N_2$, wherein A'= Ln, Bi, Al, Fe, A''= Ln, Bi, B = V, Nb, Ta, Mo, W or an oxide-nitride pigment of the general formula $A'_2 DBO_3 N_3$, wherein A'= Ln, Bi, Al, Fe, D = Al, Ga, In, Ti, V, Cr, Fe, Co, Ni and B = V, Nb, Ta, Mo, W and with means for operating the electric light source.

2. An electric lamp as claimed in claim 1, characterized in that the electric lamp is an incandescent lamp.

3. An electric lamp as claimed in claim 1, characterized in that the coating is provided on the inside of the bulb.

4. An electric lamp as claimed in claim 1, characterized in that the coating additionally comprises a white pigment.

5. An electric lamp as claimed in claim 1, characterized in that the pigment is electrostatically deposited on the inside of the light-transmitting bulb.

6. An electric lamp as claimed in claim 2, characterized in that the electric lamp is evacuated.

7. An electric lamp as claimed in claim 4, characterized in that the white pigment is selected from the group consisting essentially of kaolin, feldspar, silicon dioxide and titanium dioxide.

8. An electric lamp which is provided with an electric light source in a light-transmitting bulb provided with a coating comprising an inorganic colored pigment selected from the group formed by oxide nitride pigments of the general formula $A_{1-x} A'_x BO_{2-x} N_{1+x}$, wherein A = Mg, Ca, Sr, Ba, Zn, A'= Ln, Bi, Al, Fe, B = V, Nb, Ta, Mo, W and B'= Ti, Zr, Hf, Sn, Ge, Si, Nb, Ta and $0 < x < 1$ or an oxide-nitride pigment of the general formula $AB_{1-x} B'_x BO_{1+x} N_{2-x}$, wherein A = Mg, Ca, Sr, Ba, Zn, A'= Ln, Bi, Al, Fe, B = V, Nb, Ta, Mo, W and B'= Ti, Zr, Hf, Sn, Ge, Si, Nb, Ta and $0 < x < 1$ or an oxide-nitride pigment of the general formula $A_y A'_{2-y} B_2 O_{5+y} N_{2-y}$, wherein A = Mg, Ca, Sr, Ba, Zn, A'= Ln, Bi, Al, Fe, B = V, Nb, Ta, Mo, W and B'= Ti, Zr, Hf, Sn, Ge, Si, Nb, Ta and $0 < y < 2$ or an oxide-nitride pigment of the general formula $A'_2 B_{2-y} B'_y O_{5+y} N_{2-y}$, wherein A = Mg, Ca, Sr, Ba, Zn, A'= Ln, Bi, Al, Fe, B = V, Nb, Ta, Mo, W and B'= Ti, Zr, Hf, Sn, Ge, Si, Nb, Ta and $0 < y < 2$ or an oxide-nitride pigment of the general formula $CD_{2-m}D'_mO_{4-m}N_m$, wherein C=Mg, Ca, Mn, Fe, Co, Ni, Zn and D=Al, Ga, In, Ti, V, Cr, Fe, Co, Ni and D'=Ti, Zr, HF, Sn, Ge, Si, Nb, Ta, and $0<m<2$ or an oxide-nitride pigment of the general formula $C_{1-n}C'_nD_2O_{4-n}N_n$, wherein C'=Mg, Ca, Mn, Fe, Co, Ni, Zn, C=Al, Ga, In, Ti, V, Cr, Fe, Co, Ni, D=Al, Ga, In, Ti, V, Cr, Fe, Co, Ni and $0<n<2$ or an oxide-nitride pigment of the general formula $A'_2CBO_5N$, wherein A'=Ln, Bi, Al, Fe, C=Mg, Ca, Mn, Fe, Co, Ni, Zn, B=V, Nb, Ta, Mo, W or an oxide-nitride pigment of the general formula $A'_2A''BO_4N_2$, wherein A'=Ln, Bi, Al, Fe, A''=Ln, Bi, B=V, Nb, Ta, Mo, W or an oxide-nitride pigment of the general formula $A'_2DBO_3N_3$, wherein A'=Ln, Bi, Al, Fe, D=Al, Ga, In, Ti, V, Cr, Fe, Co, Ni and B=V, Nb, Ta, Mo, W and also comprising a white pigment,
and with means for operating the electric light source.

* * * * *